C. C. WHITTAKER.
SYSTEM OF CONTROL.
APPLICATION FILED DEC. 20, 1916.

1,326,315.

Patented Dec. 30, 1919.
4 SHEETS—SHEET 1.

Fig. 1

WITNESSES:
Fred C. Wilharm
W. R. Coley

INVENTOR
Charles C. Whittaker
BY
Wesley G. Carr
ATTORNEY

C. C. WHITTAKER.
SYSTEM OF CONTROL.
APPLICATION FILED DEC. 20, 1916.

1,326,315.

Patented Dec. 30, 1919.
4 SHEETS—SHEET 3.

WITNESSES:
R. J. Fitzgerald.
W. R. Coley

INVENTOR
Charles C. Whittaker.
BY
ATTORNEY

C. C. WHITTAKER.
SYSTEM OF CONTROL.
APPLICATION FILED DEC. 20, 1916.

1,326,315.

Patented Dec. 30, 1919.
4 SHEETS—SHEET 4.

WITNESSES:
Fred. C. Nilharm
W. R. Coley

INVENTOR
Charles C. Whittaker
BY
Wesley E. Carr
ATTORNEY

UNITED STATES PATENT OFFICE.

CHARLES C. WHITTAKER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,326,315.  Specification of Letters Patent.  Patented Dec. 30, 1919.

Application filed December 20, 1916. Serial No. 138,032.

*To all whom it may concern:*

Be it known that I, CHARLES C. WHITTAKER, a citizen of the United States, and a resident of Wilkinsburg, in the county of Allegheny and State of Pennsylvania, have invented a new and useful Improvement in Systems of Control, of which the following is a specification.

My invention relates to systems of control and especially to regenerative systems for electric railway motors and the like.

In a co-pending application of L. M. Perkins, Serial No. 83,724, filed March 13, 1916, patented May 28, 1918, No. 1,268,052, and assigned to the Westinghouse Electric & Manufacturing Company, is set forth a regenerative control system embodying a plurality of separately-excited momentum-driven machines that are adapted for either parallel or series operation in accordance with the initial regenerative speed, and a selective relay device for automatically initially connecting the machines in either parallel or series relation by reason of the voltage that is generated by the momentum-driven armatures, which voltage is dependent upon the vehicle speed.

As is more or less customary, a variable resistor is initially included in circuit with the machines in the above-mentioned system, and it is desirable that such resistor be gradually excluded from circuit in accordance with the operation of a limit switch that is energized by the regenerated current. However, it has been found that the selective relay device operates to connect the machine to the supply circuit when a relatively weak field-excitation obtains. Thus, the resistor short-circuiting switches are rapidly closed before the regenerated current is sufficient to normally operate the limit switch, with the undesirable results of too heavy braking currents and rate of retardation during the initial regenerative period, especially under relatively high-speed conditions.

It is the object of my present invention to provide means for automatically preventing the exclusion of the above-mentioned resistor from circuit until the field-winding current has attained a predetermined value, namely, the full amount for the initial excitation of the momentum-driven machines.

More specifically stated, it is the object of my invention to provide, in connection with the previously-recited variable resistor and limit switch, a relay device that is energized in accordance with the field-winding current for rendering the limit switch inoperatve to close the resistor short-circuiting switches until the field-winding current has been built-up by an auxiliary source of energy to the desired value.

My invention may best be understood by reference to the accompanying drawings, wherein.

Figure 1:
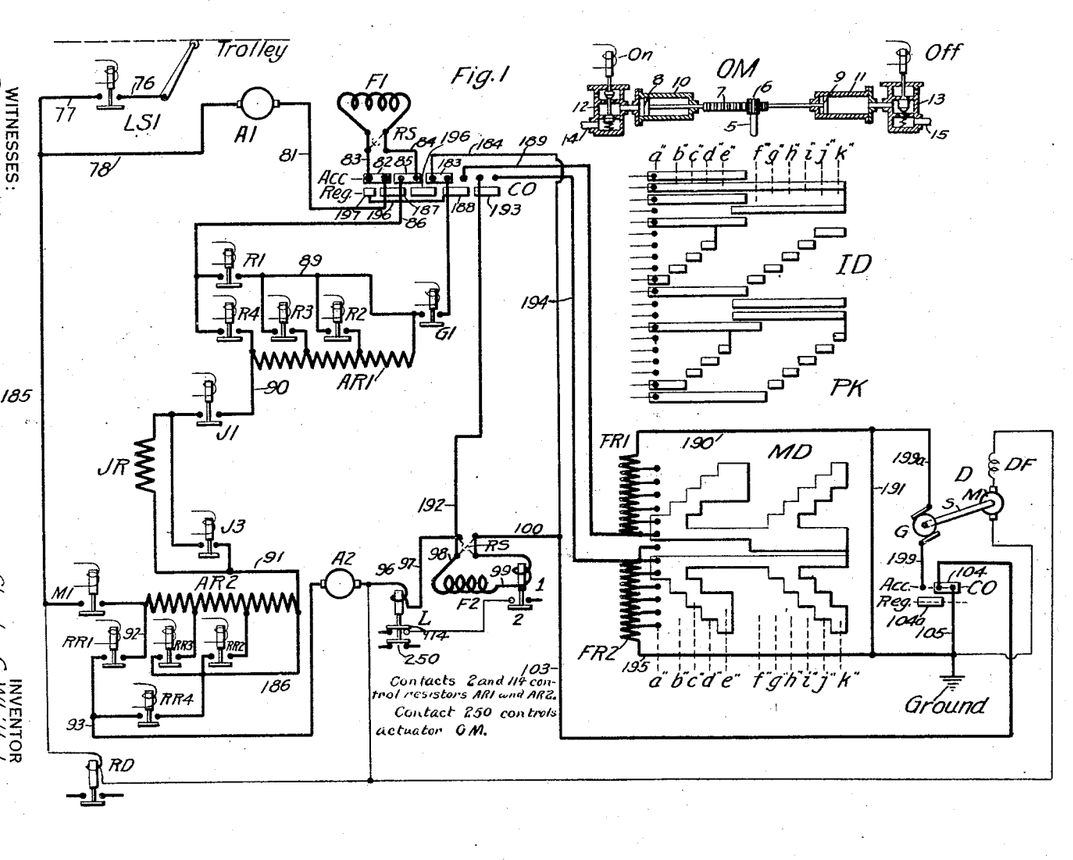
Figure 1 is a diagrammatic view of the main circuits of a system of control embodying my invention.
Figure 2:
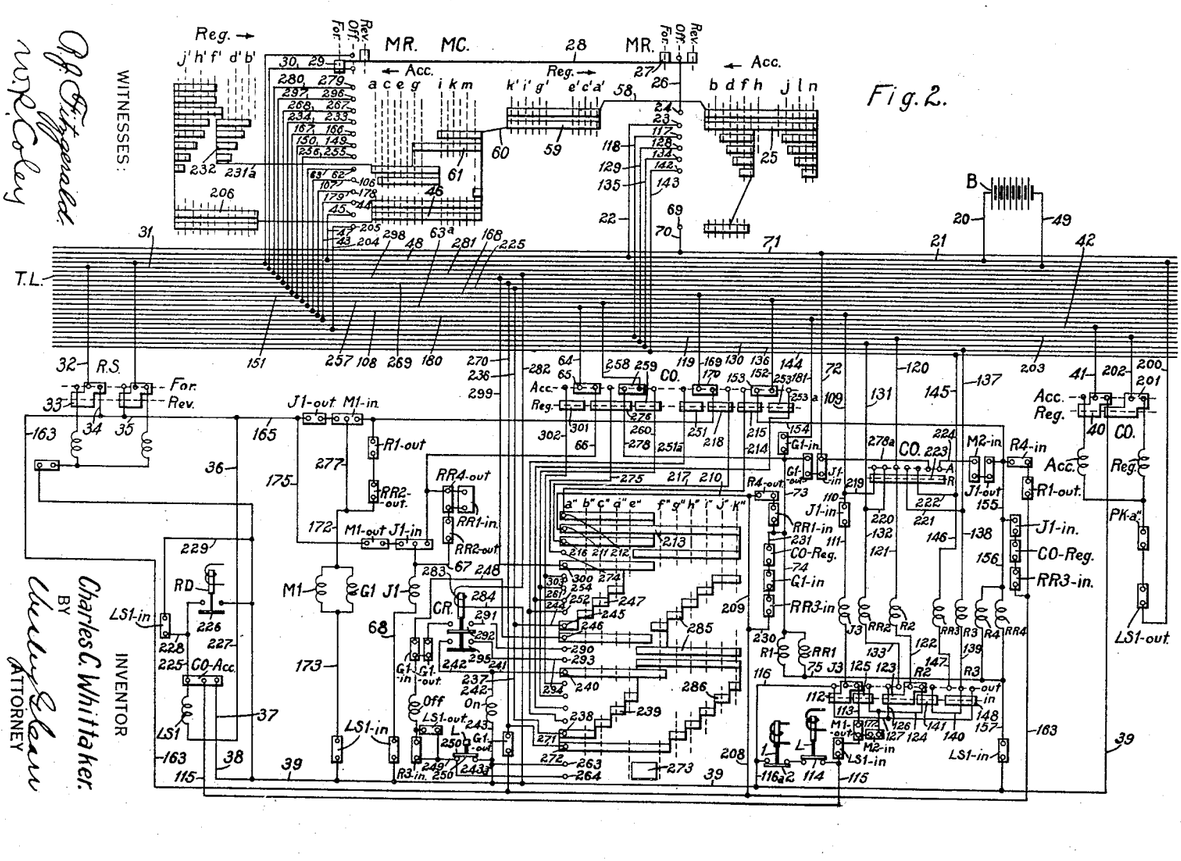
Fig. 2 is a diagrammatic view of the auxiliary governing circuits for manipulating the various circuit-switches that are illustrated in Fig. 1.

Referring to Fig. 1, the system shown comprises a plurality of suitable supply-circuit conductors respectively marked Trolley and Ground; a plurality of dynamo-electric machines respectively having armatures A1 and A2 and field-magnet windings F1 and F2 of the series type; a reversing switch RS, here shown conventionally, but preferably of a familiar electrically-controlled type, as indicated in the auxiliary circuits of Fig. 2, for reversing the electrical relations of the several main armatures and field windings; a main-circuit resistor AR1 with which is associated a plurality of suitable short-circuiting switches R1, R2, R3 and R4; a second main-circuit resistor AR2 with which is similarly associated a plurality of switches RR1, RR2, RR3 and RR4; a third main-circuit resistor JR that is adapted to be short-circuited by a switch J3; a plurality of motor-controlling switches LS1, J1, M1, and G1; a limit switch L of a familiar type; a field-winding current relay 1 for a novel purpose to be described; a change-over switch CO, preferably of the drum type and electrically controlled, as explained in connection with Fig. 2, for arranging certain of the main-motor, and also the auxiliary, circuits during both the accelerating and regenerative periods in accordance with its occupation of the positions marked Acc. and Reg.; a field-circuit controlling device PK of the drum type, having an operating mechanism OM, for varying the active value of a plurality of resistors FR1 and FR2 that are disposed in circuit with the main field windings during the regenerative period, as set forth later; a motor-generator or dynamotor D of a familiar type for supplying exciting energy to the main field-winding circuits during the regenerative period; and a relay device RD, which is associated with the main and the auxiliary circuits in a manner to be described.

The dynamotor D is shown as comprising a driving or motor armature M that is connected through a suitable field winding DF across the supply circuit, and a generator or exciting armature winding G that is preferably disposed upon the same shafts as the motor armature. However, it will be appreciated that any other suitable type of dynamotor or an equivalent motor-generator set may be employed, if desired, and the customary functions of such a machine, for example, driving air-compressors and furnishing energy for various auxiliary circuits, may be utilized, if deemed advisable.

The relay device RD is preferably of a familiar solenoid type, and the actuating coil thereof is connected from the higher-voltage terminal of the switch M1 to the lower voltage terminal of the armature A2. It will be observed that, when the parallel-connecting switches M1 and G1 are closed, the relay device receives the voltage of each of the parallel-related armatures, while, upon the closure of the series-connecting switch J1 and the opening of the parallel-connecting switches, the relay device is energized in accordance with the combined voltages of the two sets of armatures, for regenerative purposes to be set forth.

The control device PK comprises a main drum portion MD that is provided with suitable stationary and movable contact members for gradually short-circuiting the field-circuit resistors FR1 and FR2 as the drum is moved through its successive positions $a''$ to $e''$ which correspond to parallel operation of the momentum-driven machines, and for again gradually short-circuiting the field-circuit resistors as the drum is actuated through its successive positions $f''$ to $k''$ which correspond to series connection of the regenerating machines. An auxiliary interlocking drum ID is rotatable with the main drum MD, being preferably mounted on the same shaft 5, and is employed for the purpose of controlling the operation of the mechanism OM as described in connection with Fig. 2, whereby a step-by-step movement of the PK controller is effected.

The operating mechanism OM is of a familiar type and comprises a pinion 6 that is rigidly secured to the end of the shaft 5 of the PK controller and meshes with a horizontally movable rack member 7, with the ends of which a plurality of pistons 8 and 9 are respectively associated. A plurality of suitable operating cylinders 10 and 11 are provided for the pistons 8 and 9, and a plurality of valve members 12 and 13 are adapted to admit fluid pressure from any suitable source (not shown) through pipes or passages 14 and 15, respectively, in accordance with predetermined conditions to be described. The valve 12 is normally closed to exclude fluid-pressure from the cylinder 10 and to permit communication of the cylinder with the atmosphere. An actuating coil On is provided for controlling the action of the valve 12. On the other hand, the valve 13 is normally open to admit fluid-pressure to the cylinder 11, whereby the operating mechanism is biased to the position shown, and an actuating coil Off is supplied for closing the valve 13, as described in connection with Fig. 2.

To effect forward movement of the controller PK, the on and the off coils are simultaneously energized, whereupon the initial unbalanced fluid-pressure conditions are reversed to actuate the pistons toward the right. If it is desired to arrest the controller movement at any point, the off coil is deënergized, and balanced-pressure conditions obtain in the two cylinders, thus positively and reliably stopping the controller. To effect return movement, it is merely necessary to deënergize both coils, whereby the initial unbalanced-pressure conditions are restored and the pistons are moved to the illustrated positions.

Figure 5:
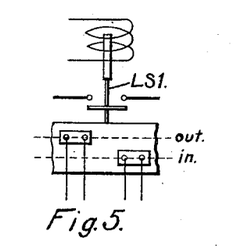
Fig. 5 is a detailed diagrammatic view of one of the complete main-circuit switches that are shown in Fig. 1.

The auxiliary governing system that is shown in Fig. 2 comprises, in addition to the actuating coils of the various switching devices that are illustrated in Fig. 1, a plurality of interlocking contact members of a familiar type that are illustrated in Fig. 5 in connection with the switch LS1, and the interlocking drum ID, a master controller MC that is adapted to occupy a plurality of operative positions $a$ to $n$, when operated in one direction that corresponds to acceleration of the motors, and a plurality of operating positions $a'$ to $k'$, when moved in the opposite direction that corresponds to regeneration of the momentum-driven machines; a master reverser MR of a familiar type; a suitable source of energy, such as a battery B, for energizing the various actuating coils through the master controller MC and through a plurality of train-line conductors TL, whereby multiple-unit operation of my system may be readily effected, as will be understood; a control relay CR, for a purpose to be described; and certain auxiliary contact members of the change-over switch CO, the limit switch L, the field-winding current relay I, and the relay device RD, which closes certain auxiliary circuits in a manner to be set forth.

Figure 3:
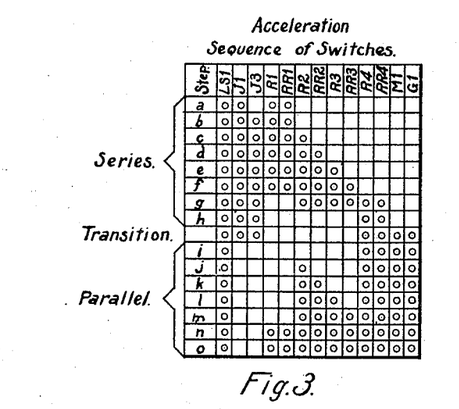
Fig. 3 and Fig. 4 are sequence charts of well-known form for indicating the desired order of operation of the various switches during the accelerating and regenerative periods, respectively.
Figure 4:
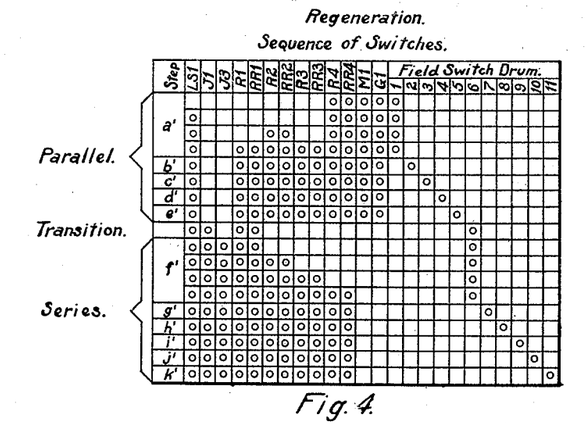

Assuming that it is desired to effect acceleration of the main motors, the master controller MC may be actuated to its initial accelerating position $a$, provided that the master reverser MR and the main reversing-switch RS occupy their forward positions, as illustrated, whereupon, one circuit is established from the positive terminal of the battery B through conductor 20, train-line conductor 21, conductor 22, control fingers 23 and 24, which are bridged by contact segment 25 of the master controller in its position $a$, conductor 26, contact member 27, conductor 28 and contact member 29 of the master reverser MR in its forward position, conductor 30, train-line conductor 31, conductor 32, contact member 33 of the main reversing switch RS in its forward position, conductors 34, 35 and 36, the actuating coil of the switch LS1 and an interlock CO—Acc., whence circuit is completed through conductors 37, 38 and 39, contact member 40 of the change-over switch CO in its position Acc., conductor 41, train-line conductor 42, conductor 43, control fingers 44 and 45, which are bridged by contact segment 46 of the master controller, conductor 47, train-line conductor 48 and conductor 49 to the negative terminal of the battery B. The switch LS1 is thus closed, as indicated in the sequence chart of Fig. 3.

A further circuit is established, at this time, from the contact segment 25 of the master controller through conductor 58, contact segment 59, conductor 60, contact segment 61 and control finger 62 of the various sections of the master controller; conductor 63, train-line conductor 63a, conductor 64, contact member 65 of the change-over switch CO in its position Acc., conductor 66, interlocks RR4—out and RR2—out, conductor 67, the actuating coil of the switch J1, conductor 68 and the interlock LS1—in to the negative conductor 39. Upon the closure of the switch J1, a holding circuit therefor is formed by interlock J1—in, which directly connects conductors 66 and 67.

Still another circuit is established in position $a$ of the master controller from contact segment 25 through control finger 69, conductor 70, train-line conductor 71, conductor 72, interlocks J1—in and G1—out, conductors 73 and 74, the parallel-connected actuating coils of the switches R1 and RR1, conductor 75 and interlock LS1—in to the negative conductor 39.

Figure 6:
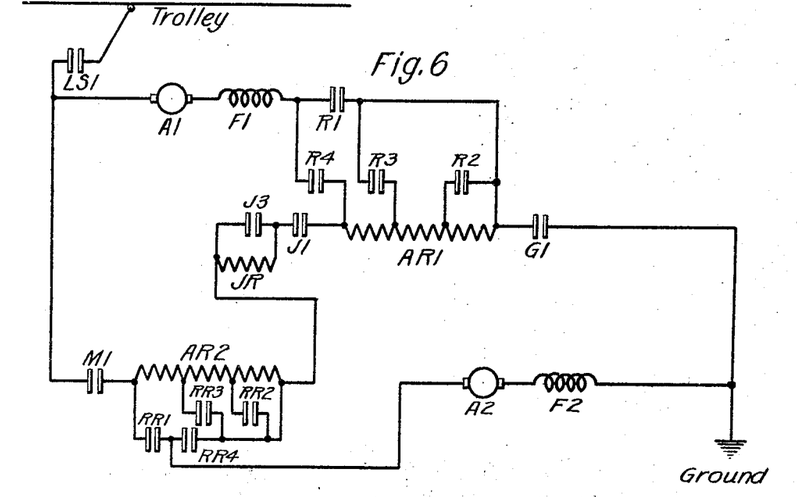
Fig. 6 and Fig. 7 are simplified views of the accelerating and the regenerative circuit connections, respectively.

Referring temporarily to the main circuits that are shown in Fig. 1, the closure of the various switches that have been mentioned completes a main circuit from the trolley through conductor 76, the switch LS1, conductors 77 and 78, the armature A1, conductor 81, contact member 82 of the change-over switch CO in its position Acc., conductor 83 and certain contact members of the reversing-switch RS, field winding F1, reversing switch RS, conductor 84, contact member 85 of the change-over switch CO, conductor 86, switch R1, conductor 89, the entire resistor AR1, conductor 90, switch J1, resistor JR, conductor 91, the entire resistor AR2, conductor 92, switch RR1, conductor 93, armature A2, conductor 96, the actuating coil of the limit switch L, conductor 97, reversing switch RS, conductor 98, field-winding F2, conductor 99, the actuating coil of the field winding current relay I, reversing-switch RS, conductors 100 and 103, contact member 104 of the change-over switch CO in its position Acc., and conductor 105 to the negative supply-circuit conductor Ground. (See Fig. 6.)

Referring again to Fig. 2, when the master controller MC is actuated to its second accelerating position $b$, a circuit is established from the positively energized contact segment 61, through control finger 106, conductor 107, train-line conductor 108, conductors 109 and 110, interlock J1—in, conductor 111, the actuating coil of the switch J3, interlock 112—J3—out, conductor 113, interlock M1—out, interlock LS1—in, conductor 115, contact member CO—Acc. and conductor 37 to the negative conductor 39. As soon as the switch J3 is closed, an additional holding circuit therefor is completed from the actuating coil thereof through interlock 112—J3—in and conductors 116 and 116a to conductor 39, which additional circuit is employed in connection with certain other resistor-short-circuiting switches, as about to be described.

In position $c$ of the master controller, the contact segment 25 engages control finger 117, whence circuit is completed through conductor 118, train-line conductor 119, conductors 120 and 121, the actuating coil of the switch R2, conductor 122, interlock 123—R2—out, conductor 124, interlock 125—J3—in, and thence through conductor 113, as previously described. Upon the closure of the switch R2, a holding circuit therefor is completed from conductor 122, through interlock 123—R2—in, and conductors 126 and 127, to the conductor 116.

In position $d$ of the master controller, a circuit is completed from the contact segment 25 through control finger 128, conductor 129, train-line conductor 130, conductors 131 and 132, the actuating coil of the switch RR2, conductor 133, and thence through interlock 123—R2—in, as already set forth.

In position *e*, a circuit is completed from the contact segment 25 through control finger 134, conductor 135, train-line conductor 136, conductors 137 and 138, the actuating coil of the switch R3, conductors 139 and 140, interlock 141—R2—in, and thence through conductor 124, as previously described.

In position *f*, a further circuit is completed from the contact segment 25 through control finger 142, conductor 143, train-line conductor 144, conductors 145 and 146, the actuating coil of the switch RR3, conductor 147 and interlock 148—R3—in, a common holding circuit for the switches R3 and RR3 being completed from the interlock 148 through conductor 127 to the conductor 116.

In position *g*, a circuit is established from the contact segment 61 of the master controller through control finger 149, conductor 150, train-line conductor 151, conductor 152, contact member 153 of the change-over switch CO in its position Acc., conductors 154, 155 and 156, the actuating coils of the switches R4 and RR4, conductor 157 and interlock LS1—in to the negative conductor 39.

In position *g*, the initial energizing circuit of the actuating coils of the switches R1 and RR1 is also opened after the closure of the switches R4 and RR4, by reason of the disengagement of the control finger 69 from the contact segment 25. Such action, however, does not vary the main-circuit resistance since direct shunting paths around the main-circuit resistors AR1 and AR2 are provided through the switches R4 and RR4, respectively. An open-main circuit at this time is prevented by the use of a holding circuit including conductors 35, 163, 208 and 209, interlocks R4—out and RR1—in and conductor 74 which is connected to the R1 and RR1 switch-actuating coils, thus preventing the opening of switches R1 and RR1 until the closure of switches R4 and RR4.

In position *h*, the switches R2, RR2, R3 and RR3 are opened by reason of the disengagement of the contact segment 25 from the corresponding control fingers.

To effect initial parallel connection of the motors, the master controller may be moved toward its position *i*, whereupon, at first, the contact segment 61 engages control finger 166, whence circuit is completed through conductor 167, train-line conductor 168, conductor 169, contact member 170 of the change-over switch CO in its position Acc., conductor 171, interlocks R1—out and RR2—out, conductor 172, the parallel-related actuating coils of the switches M1 and G1, conductor 173, and interlock LS1—in to the negative conductor 39.

Immediately after the closure of the switches just mentioned, the contact segment 61 of the master controller becomes disengaged from the control fingers 62 and 106, thereby deënergizing the previously described circuits of the actuating coils of the switches J1 and J3, respectively. However, the opening of the switch J1 before the closure of the switches M1 and G1 is prevented by an interlocking arrangement similar to that set forth in connection with the switches R4 and RR4, namely, comprising conductors 165 and 175, interlock M1—out and interlock J1—in, which is connected directly to the actuating coil of the switch J1. Thus, the energization of the J1 actuating coil is maintained through the holding circuit just recited until the switch M1 closes to interrupt the connection between conductor 175 and interlock J1—in.

Referring, for the time being, to Fig. 1, the main circuits that are established in the initial parallel connections of the motors that correspond to position *i* of the master controller may be set forth as follows: from the trolley through the main armature A1, main field winding F1, switch R4, and the resistor AR1, as previously described, switch G1, contact member 183 of the change-over switch CO in its position Acc., conductor 184 and conductor 103 to the negative supply-circuit conductor Ground, as already traced. The circuit of the other motor is completed from the trolley through conductors 76, 77 and 185, switch M1, the resistor AR2, conductor 186, switch RR4, conductor 93 and then through the other motor to ground, as previously described. The motor having the armature A1 and the resistor AR1 thus comprise a circuit that is disposed in parallel relation to a circuit including resistor AR2 and the motor having the armature A2.

In position *j* (Fig. 2), the contact segment 25 reëngages control finger 117, whence circuit is established as previously recited through the actuating coil of the switch R2, thence through the interlock 123—R2—out, conductors 124 and 177, interlocks M2—in and LS1—in and thence through conductor 115 to the negative battery terminal, as previously described. Upon the closure of the switch R2, the hereinbefore described holding circuit for the actuating coil thereof is again completed.

In the next three positions *k*, *l* and *m* of the master controller, the control fingers 128, 134 and 142 respectively make contact with the contact segment 25 to effect the closure of switches RR2, R3 and RR3, as previously set forth.

In the final position *n*, the contact segment 61 of the master controller engages control finger 178, whence circuit is completed through conductor 179, train-line conductor 180, conductor 181, interlock G1—in and conductors 73 and 74 to the actuating coils of the switches R1 and RR1, in accordance with a circuit already traced. Although the resistor-short-circuiting switches are manipulated during the parallel operation of the motors in a different sequence from that employed during the series acceleration of the motors, it will be observed that the change of sequence is necessary by reason of the altered relations of the main-circuit resistors with respect to the motors, and, in either case, the manipulation of the switches is such as to gradually effect acceleration of the motors.

More specifically stated, the switches R1 and RR1 are initially employed, whereby the current traverses the corresponding resistors in a certain direction during series acceleration; whereas the switches R4 and RR4 are employed during the first portion of parallel acceleration, and the current traverses the main resistors in the opposite direction. However, by connecting the intermediate switches, R2 and R3, for example, from intermediate points of the resistor AR1 to the terminal of the switch R1 that is remote from the armature A2, the same sequence of operation of the intermediate switches may be employed during both series and parallel operation, which is desirable for manufacturing and commercial reasons.

Assuming that the vehicle is coasting at a relatively high speed and that it is desired to effect regenerative operation of the system, the master controller MC may be actuated to its initial regenerative position $a'$, whereupon a circuit is first established from the positive terminal of the battery B through conductor 20, train-line conductor 21, conductor 200, interlocks LS1-out and PK-$a''$, the actuating coil Reg. of the change-over switch CO, contact member 201 of the change-over switch in its position Acc., conductor 202, train-line conductor 203, conductor 204, control fingers 205 and 45, which are bridged by contact segment 206 of the master controller in its position $a'$, and thence, through conductor 47, to the negative battery terminal, as already described in connection with the motor acceleration. The change-over switch is thus actuated to its regenerative position Reg., in a well-known manner.

The switch LS1 is not closed at this time by reason of the exclusion of the contact member CO—Acc. from the energizing circuits of its actuating coil. The closure of the switch LS1 is entirely dependent upon the upward actuation of the relay device RD, which takes place, under certain regenerative conditions, in a manner to be described.

A further circuit is established from the conductor 34 through conductors 163, 208, 209 and 210, control fingers 211 and 212, which are bridged by contact segment 213 of the interlock drum ID, conductor 214, contact member 215 of the change-over switch CO in its position Reg. and conductor 154 to the actuating coils of the switches R4 and RR4, as hereinbefore described.

A circuit is established simultaneously from the contact segment 213 of the interlock drum ID through control finger 216, conductor 217, contact member 218 of the change-over switch and thence to the actuating coils of the switches M1 and G1, as already traced.

In the meantime, the field windings of the main machines are excited by the generator armature G in accordance with circuits about to be traced, and the voltage of the main momentum-driven armatures is thus built up to a point where the combined effect of the machine speed and field excitation suffices to produce a voltage across each of the two armatures A1 and A2, or, in other words, impresses a voltage upon the actuating coil of the relay device RD, that is preferably higher than the supply-circuit voltage by a predetermined amount, whereupon, the relay device is actuated to its upper position to complete the circuit of the actuating coil of the switch LS1 from the conductor 36 through the actuating coil, conductor 225, auxiliary contact members 226 of the relay device RD in its upper or closed position, and conductor 227 to the negatively-connected conductor 37. Upon the closure of the switch LS1, a holding circuit therefor is formed from conductor 225, through conductor 228, interlock LS1—in, and conductor 229 to conductor 227, whereby the auxiliary contact members of the relay device RD are bridged, and the device is inoperative with respect to varying the circuit connections during the remainder of the regenerative operation.

However, as previously stated, the relay device RD lifts when only a relatively weak field-winding current has been attained, and it is desirable that the field-winding current reach its full and steady initial value before the main resistor-short-circuiting switches begin to close. The field-winding current relay 1 accomplishes the desired result, in the following manner:

The auxiliary contact members of the relay 1 are connected in series relation with the actuating coils of certain of the resistor-short-circuiting switches, in accordance with a circuit about to be traced, and, consequently, such switches cannot be closed until the relay 1 occupies its upper position, that is, until the desired full initial value of the field-winding current obtains.

Upon the closure of the switch LS1 and the actuation of the relay 1, the previously-mentioned interlock LS1—in completes the circuits of the actuating coils of the switches RR2, R2, R3 and RR3, which are respectively connected through conductors 220, 121, 221 and 222 to suitable control fingers that are joined by a contact member 223—CO—Reg., to which energy is supplied from the conductor 154 through interlocks J1—out and M2—in and conductor 224. In this case, however, the conductor 115 is open-circuited at the change-over switch, and circuit is completed from interlock LS1—in through contact members 114 of the limit switch L, contact member 2 of the relay 1, and conductor 116a to the negative conductor 39.

Since an appreciable interval of time, approximately one and one-half seconds in a typical case, is necessary for the desired initial field-winding current from the auxiliary generating armature G to build up, a sufficient regenerated or armature current will have been established to lift the limit switch L, and the remainder of the automatic regenerative operation is governed by the limit switch, since, once the field-winding current relay 1 has been raised to its closed position, it cannot possibly drop out during the remaining operation, because each succeeding step of the field-regulating controller PK effects the traversal of more current through the field windings and the actuating coil of the relay 1 than the initial relay-lifting value, as will be understood.

My present invention is of especial value in cases where the initial regenerative speed is higher than the normal starting value, providing means whereby the system is saved from damage by reason of the sudden use of regenerative braking when a vehicle has attained a high speed down a grade, for example. The time required for the relay device RD to lift and thereby effect the connection of the machines to the supply circuit bears an inverse relation to the initial regenerative speed, since the regenerated voltage is proportional to the product of field-winding excitation and machine speed. Consequently, in systems not provided with my field-winding current relay 1, it is possible to begin regeneration at a high speed with a very heavy current by the time the full field-winding current has built up, and the resistor-short-circuiting switches quickly close to maintain or aggravate such undesirable conditions. By the use of my present invention, however, after the closure of the line switch LS1, and the building up of the field-winding-current to the steady "first-notch" value, in accordance with the time-element of the auxiliary generating armature, no further operation of the system to short-circuit the resistors, etc., can possibly occur until the machine speed has been reduced to a suitable value, that is, until the regenerated current decreases sufficiently to allow the normal operation of the limit switch. Thus, the field-winding current relay 1 and the limit switch L act in conjunction to automatically prevent injurious conditions in the system under relatively high-speed operation.

The progressive closure of the resistor-short-circuiting switches thus occurs a short time after the closure of the switch LS1 and the attainment of a predetermined field-winding current, to short-circuit the main resistors AR1 and AR2, dependent upon the main armature current. Thus a steady initial regenerated current of a normal value and producing a suitable retarding effort is automatically obtained.

Figure 7:
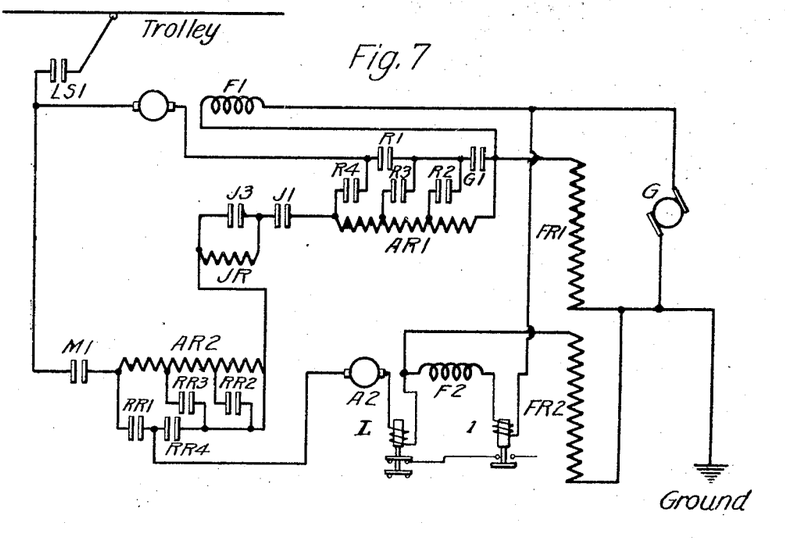

Referring temporarily to the main circuits that are shown in Fig. 1, the connections that are established by the actuation of the change-over switch CO and the closure of the connecting switches just recited may be set forth as follows: one circuit is completed from the lower-voltage terminal of the armature A1, through conductor 81, contact member 187 of the change-over switch CO in its position Reg., conductor 86, switch R1, conductor 89, switch G1, contact member 188 of the change-over switch, conductor 189, field-regulating resistor FR1 and conductors 190 and 191 to the negative supply-circuit conductor Ground. A similar circuit for the other motor is completed from the lower-voltage terminal of the armature A2 through conductor 96, the actuating coil of the limit switch L, conductors 97 and 192, contact member 193 of the change-over switch, conductor 194, field-regulating resistor FR2 and conductor 195 to the negative supply-circuit conductor Ground. The two motor armatures are thus respectively connected in series relation with the regulating resistors FR1 and FR2 across the supply circuit (see Fig. 7).

A further main circuit is established from the contact member 188 of the change-over switch through conductor 196, contact member 197, conductor 83, the field winding F1, conductor 84, contact member 196 of the change-over switch, conductors 184 and 103, contact member 104$^a$ of the change-over switch in its position Reg., conductor 199, the exciting armature G and conductor 199$^a$ to the conductor 190. A similar circuit for the other field winding is completed from the conductor 97 through conductor 98, the field winding F2, the actuating coil of the field-winding current relay 1, conductor 100 and thence to conductor 103 and the exciting armature G as just described. The exciting armature G is thus connected to excite the main field windings through the resistors FR1 and FR2, respectively. However, such arrangement of main-circuit connections forms no material part of my present invention, but is fully shown and described in a co-pending application of R. E. Hellmund, Serial No. 44,443, filed August 9, 1915, and assigned to the Westinghouse Electric & Manufacturing Company.

A further auxiliary circuit is then established from the conductor 208 through conductor 230, interlocks RR3—in, G1—in and CO—Reg. and conductors 231 and 74 through the actuating coils of the switches R1 and RR1, as previously set forth.

When the master controller is moved to its second regenerative position $b'$, a circuit is completed from the contact segment 232, which is connected by conductor 231a to the segment 61 of the master controller, through control finger 233, conductor 234, train-line conductor 235, conductor 236, where the circuit divides, one branch including conductor 237, control finger 238, contact segment 239 and control finger 240 of the interlock drum ID, conductors 241 and 242, the actuating coil On and conductors 243 and 243a to the negative conductor 39, and the other branch including conductor 244, control fingers 245 and 246, which are bridged by contact segment 247, conductor 248, interlock G1—in, the actuating coil Off, interlock R3—in, conductor 249, auxiliary contact members 250 of the limit switch L in its lower or operative position, and thence through conductor 243a to the negative conductor 39. Inasmuch as the two actuating coils On and Off of the PK controller are simultaneously energized, forward movement of the controller to its position $b''$ occurs in accordance with the principles already set forth.

In position $b''$ of the interlock drum, the circuit of the actuating coil On is maintained by the engagement of the control finger 238 with the contact segment 239, while the control finger 245 becomes disengaged from the contact segment 247, thereby deënergizing the actuating coil Off and, consequently, effecting the previously - described balanced-pressure conditions in the operating mechanism OM to positively and reliably stop the PK controller in position $b''$.

In position $c'$ of the master controller, the contact segment 232 engages control finger 166, whence circuit is completed through conductor 167, train-line conductor 168, conductor 169, contact segment 251 of the change-over switch, conductor 251a and control finger 252 which is connected to contact segment 247 of the interlock drum ID in position $b''$ thereof. The two actuating coils On and Off are thus again simultaneously energized and the PK controller is actuated to its position $c''$, whereupon the control finger 252 is disconnected from the contact segment 247, while the contact segment 239 engages another control finger that corresponds to control finger 252 and thus maintains the energization of the On actuating coil.

In position $d'$, contact segment 232 engages control finger 149, whence circuit is completed through conductor 150, train-line conductor 151, conductor 152, contact member 253 of the change-over switch, conductor 253a and control finger 254, which engages contact segment 247 of the interlock drum in position $c''$ and thus permits movement of the drum in the manner already described as far as position $d''$.

In position $e'$ of the master controller, a control finger 255 engages the contact segment 232, whence circuit is completed through conductor 256, train-line conductor 257, conductor 258, contact member 259 of the change-over switch CO, conductor 260 and control finger 261, which engages the contact segment 247 of the interlock drum in position $d''$ and thus permits movement of the drum to position $e''$, which corresponds to the last parallel position of the regenerating armatures.

It should be observed that the limit switch L may or may not be employed, that is to say, the master controller may be manipulated by the train operator in such manner that the limit switch will not be actuated, but under ordinary braking conditions, the limit switch is preferably employed, so that, when the machine current exceeds a predetermined value, the limit switch L lifts to temporarily interrupt the circuit of the actuating coil Off and thus arrest the movement of the controller PK. It will be understood that, when the limit switch is utilized, the master controller may be initially actuated to its positions $e'$ or $k'$, and the controller PK will then advance from notch to notch in accordance with the action of the limit switch L, as is familiar practice.

If the master controller MC is moved toward its initial series position $f'$, a circuit is first established from the contact segment 232 through control finger 267, conductor 268, train-line conductor 269, conductors 270 and 271 and control finger 272 which engages the contact segment 239 of the interlock drum and, consequently, maintains the energization of the actuating coil On during the transitional movement of the controller PK. A new circuit for similarly maintaining the energization of the Off coil circuit comprises control finger 296 which engages contact segment 232, conductor 297, train-line conductor 298, conductor 299 and control finger 300 which makes contact with segment 247 until just before position $f''$ of the interlock drum ID, is reached.

The control fingers 263 and 264 are also bridged by contact segment 273 between the positions $e''$ and $f''$ of the controller PK, thus bridging the stationary contact members of the limit switch L and serving to maintain the actuating coil Off energized to insure the movement of the controller PK to its initial series position $f''$.

As soon as the controller PK passes beyond its position $e''$, the contact segment 213 engages control finger 274, whence circuit is completed through conductor 275 contact member 276 of the change-over switch CO, where the circuit divides, one branch including conductor 66, interlocks RR1—in and RR2—out, since the contact segment 232 disengages the corresponding control fingers of the master controller during the movement thereof to position $f''$, and thence through conductor 67 to the actuating coil of the switch J1, as previously set forth, and the other branch including conductor 278, interlock G1—out as soon as the switch G1 has opened, as about to be set forth, interlock J1—in and conductor 278a to the contact member 223—CO—Reg., thereby effecting the progressive closure of switches RR2, R2, R3 and RR3.

The switch J3 is also closed at this time by reason of the completion of a circuit from the interlock 223—CO—Reg., through conductors 219, 110, interlock J1—in and conductor 111, whence circuit is completed in accordance with circuits already traced. In addition, a circuit is completed from the positively energized conductor 163, through interlocks RR3—in, CO—Reg., and J1—in and conductor 156 through the actuating coils of the switches R4 and RR4, as previously described.

The initial coil-energizing circuits of the switches M1, and G1 are also opened by reason of the disengagement of the contact segment 232 from the corresponding control finger 166 during the transitional movement of the master controller, although the opening of these switches is prevented until the switch J1 is closed, by reason of an interlocking arrangement similar to that hereinbefore set forth in connection with the transition from series to parallel acceleration of the motors, such interlocking arrangement comprising the positively energized conductor 165, interlocks J1—out and M1—in and conductors 277 and 172 to the actuating coils of the switches M1 and G1, thus insuring that the switch J1 shall be closed before the holding circuit just described for the switches M1 and G1 is interrupted by the exclusion of the interlock J1—out upon the closure of the switch J1.

As soon as the master controller reaches its initial series position $f'$, one circuit is completed from the contact segment 232 through control finger 279, conductor 280, train-line conductor 281, conductor 282, actuating coil 283 of the control relay CR and conductor 284 to the negative conductor 39.

As soon as the interlock drum ID passes beyond its position $e''$, a plurality of contact segments 285 and 286 that respectively correspond to contact segments 247 and 239 engage control fingers 290 and 293, whence one circuit is completed through conductor 291, coöperating contact member 292 of the control relay CR in its upper or closed position, interlock G1—out and thence through the off coil in accordance with a circuit that has hereinbefore been traced, while the other circuit is completed from control finger 293 through conductor 294, coöperating contact members 295 of the control relay, conductor 242 and thence through the actuating coil On as previously set forth.

When the controller PK occupies its position $f'''$, the control finger 245 engages contact segment 285 and the control fingers 272 and 240 still engage the contact segment 239.

Upon actuation of the master controller to its position $g'$, the contact segment 232 engages control finger 233, whence the control finger 244 is energized to complete the circuit of the actuating coil Off and thus permit movement of the controller PK to its position $g''$, wherein the control fingers 272 and 240 become disengaged from contact segment 239 and control fingers 238 and 293 engage contact segment 286 to maintain the energization of the On actuating coil.

Upon movement of the master controller through its positions $h'$, $i'$ and $j'$, the control fingers 166, 149 and 255 are successively energized, thus completing the corresponding circuits to permit a corresponding step-by-step actuation of the controller PK.

In the final position $k'$ of the master controller, the contact segment 232 engages control finger 62, whence circuit is completed through conductor 64 as hereinbefore described, contact member 301 of the change-over switch CO, conductor 302 and control finger 303 which engages contact segment 285 and thus effects the movement of the controller PK to its final position $k''$.

As previously mentioned, the foregoing description considers the case wherein the regenerative machines are operated at a relatively high speed so that initial parallel regenerative operation is permissible.

However, if the speed of the machines is sufficiently low to preclude the possibility of employing parallel-connected regeneration even though the controller PK is actuated to its final parallel position $e''$ to fully excite the main field windings, the further movement of the master controller MC will effect the energization of the control relay and, consequently, of the actuating coils on and off and thus effect a step-by-step movement of the controller PK until the voltage across the series-related main armatures preferably exceeds the supply-circuit voltage by a predetermined amount, whereupon the relay device will be actuated to its proper position to close the line switch LS1 in accordance with the previously traced circuits, and regeneration will take place from that point on to the final position of the controller PK, in the manner already described.

As will be understood, the use of my field-winding current relay 1 is not as essential to proper operation at the beginning of series regeneration as it was during the initial parallel regenerative period, by reason of the material difference in machine speed and the consequent removal, to a considerable degree, of the above-mentioned undesirable occurrences, such as too heavy a rate of retardation.

Although I have shown and described my field-winding current relay 1 in connection with a certain type of system that is more or less complicated, it is believed that a materially simpler set of circuit connections would not fully set forth all the advantages accruing from the use of my invention.

I do not wish to be restricted to the specific circuit connections and arrangement and location of parts herein set forth, as various modifications thereof may be effected without departing from the spirit and scope of my invention and I desire, therefore, that only such limitations shall be imposed as are indicated in the appended claims.

I claim as my invention:

1. In a system of control, the combination with a supply circuit and a dynamo-electric machine having an armature winding and a field winding, of means for separately exciting one of said windings, means for connecting the machine to the supply circuit, and means for automatically preventing further operation of the system until the current in the separately-excited winding has attained a predetermined value.

2. In a system of control, the combination with a supply circuit and a dynamo-electric machine having an armature winding and a field winding, of means for separately exciting one of said windings, means for automatically connecting the machine to the supply circuit under predetermined voltage conditions, and means for preventing further operation of the system until the current in the separately-excited winding has attained a predetermined value.

3. In a system of control, the combination with a supply circuit and a dynamo-electric machine having an armature winding and a field winding, of means for separately exciting one of said windings, means for connecting the machine to the supply circuit, a main-circuit resistor, and means for varying the active circuit value of said resistor only after the current in the separately-excited winding has attained a predetermined value.

4. In a system of control, the combination with a supply circuit and a dynamo-electric machine having an armature winding and a field winding, of means for separately exciting one of said windings, means for connecting the machine to the supply circuit, a main-circuit resistor, switches for excluding certain sections of said resistor from circuit, means dependent upon the value of current in the other of said windings for effecting the gradual closure of said switches, and means for rendering said last means inoperative until the current in the separately-excited winding has attained a predetermined value.

5. In a system of control, the combination with a supply circuit and a dynamo-electric machine having an armature winding and a field winding, of means for separately exciting said field winding, means for connecting the machine to the supply circuit, and means for automatically preventing further operation of the system until the field-winding current has attained a predetermined value.

6. In a system of control, the combination with a supply circuit and a dynamo-electric machine having an armature winding and a field winding, of means for separately exciting said field winding, means for automatically connecting the machine to the supply circuit under predetermined voltage conditions, and means for automatically preventing further operation of the system until the field-winding current has attained a predetermined value.

7. In a system of control, the combination with a supply circuit and a dynamo-electric machine having an armature winding and a field winding, of means for separately exciting said field winding, means for connecting the machine to the supply circuit, a resistor initially connected in circuit with said machine, and means for gradually excluding said resistor from circuit only after the field-winding current has attained a predetermined value.

8. In a system of control, the combination with a supply circuit and a dynamo-electric machine having an armature winding and a field winding, of means for separately exciting said field winding, means for connecting the machine to the supply circuit, a resistor initially connected in circuit with said machine, switches for excluding certain sections of said resistor from circuit, means dependent upon the value of current in said armature for effecting the gradual closure of said switches, and means for rendering said last means inoperative until the field-winding current has attained a predetermined value.

9. In a system of control, the combination with a supply circuit and a dynamo-electric machine having an armature winding and a field winding, of means for separately exciting said field winding, means for connecting the machine to the supply circuit, a resistor initially connected in circuit with said machine, electrically-controlled switches for excluding certain sections of said resistor from circuit, a limit switch energized in accordance with the armature current for effecting the gradual closure of said switches, and a relay device connected to complete the circuits governed by said limit switch when the field-winding current attains a predetermined value.

10. In a system of regenerative control, the combination with a supply circuit and a momentum-driven dynamo-electric machine having an armature winding and a field winding, of means for supplying additional current to said field winding, means for connecting the machine to the supply circuit, a resistor initially connected in circuit with said machine, switches for excluding certain sections of said resistor from circuit, switching means dependent upon the value of regenerated current for effecting the gradual closure of said switches, and means for rendering said switching means inoperative until the field-winding current has attained a predetermined value.

11. In a system of regenerative control, the combination with a supply circuit and a momentum-driven dynamo-electric machine having an armature winding and a field winding, of means for supplying additional current to said field winding, means for automatically connecting the machine to the supply circuit under predetermined voltage conditions, a resistor initially connected in circuit with said machine, switches for excluding certain sections of said resistor from circuit, actuating coils for said switches, a limit switch energized in accordance with the armature current and embodying contact members for successively effecting the energization of said actuating coils, and a relay device energized in accordance with the field-winding current and embodying coöperating contact members that are connected to complete the circuit through said other contact members when the field-winding current attains a predetermined value.

12. In a system of control, the combination with a supply circuit and a dynamo-electric machine having an armature and a field winding, of means for separately exciting said field winding, means for connecting the machine to the supply circuit, means for automatically preventing further operation of the system until the field-winding current has attained a predetermined value, and means for subsequently governing the system in accordance with the regenerated current.

13. In a system of control, the combination with a supply circuit and a dynamo-electric machine having an armature winding and a field winding, of means for separately exciting said field winding, means for automatically connecting the machine to the supply circuit under predetermined voltage conditions, means for automatically preventing further operation of the system until the field-winding current has attained a predetermined value, and a limit switch for subsequently governing the system in accordance with armature-current conditions.

14. In a system of control, the combination with a supply circuit and a dynamo-electric machine having an armature winding and a field winding, of means for separately exciting said field winding, means for connecting the machine to the supply circuit, a resistor initially connected in circuit with said machine, and means for gradually excluding said resistor from circuit only after the field-winding current and the regenerated current have attained respectively predetermined values.

In testimony whereof, I have hereunto subscribed my name this 29th day of November, 1916.

CHARLES C. WHITTAKER.